United States Patent [19]

Hopkins

[11] Patent Number: 4,906,372
[45] Date of Patent: Mar. 6, 1990

[54] SPIRAL-WOUND MEMBRANE CARTRIDGE

[75] Inventor: David H. Hopkins, Escondido, Calif.

[73] Assignee: Desalination Systems, Inc., Escondido, Calif.

[21] Appl. No.: 352,999

[22] Filed: May 17, 1989

[51] Int. Cl.⁴ .................. B01D 13/00; B01D 27/00
[52] U.S. Cl. .................. 210/321.74; 210/321.78; 210/321.83; 210/321.87
[58] Field of Search .................. 210/321.74, 321.77, 210/321.78, 321.83, 321.87, 758, 321.69

[56] References Cited

U.S. PATENT DOCUMENTS

| | | | |
|---|---|---|---|
| 3,928,204 | 12/1975 | Thomas | 210/321.83 |
| 4,001,198 | 1/1977 | Thomas | 210/758 |
| 4,036,760 | 7/1977 | Bardonnet et al. | 210/321.87 |
| 4,049,550 | 9/1977 | Obidniak | 210/321.69 |

*Primary Examiner*—Frank Sever

*Attorney, Agent, or Firm*—Fitch, Even, Tabin & Flannery

[57] ABSTRACT

A reverse osmosis or ultrafiltration separation device for treating a liquid feed wherein a separation assembly is wound spirally about a central permeate-carrying tube. The assembly includes an elongated semipermeable membrane envelope which includes an interior permeate passageway and feed-passageway-providing sheet material spirally wound with said envelope to supply a liquid feed to be treated. A cylindrical housing of circular cross section having an inlet and a pair of outlets holds the spiral wound separation assembly which is tightly surrounded by a seamless, highly porous, rigid, tubular sleeve proportioned to be snugly received within the cylindrical housing. The sleeve has a predetermined thickness relative to the diameter of the housing chamber so that a desired amount of bypass flow of liquid occurs through the space generally occupied by the sleeve.

16 Claims, 2 Drawing Sheets

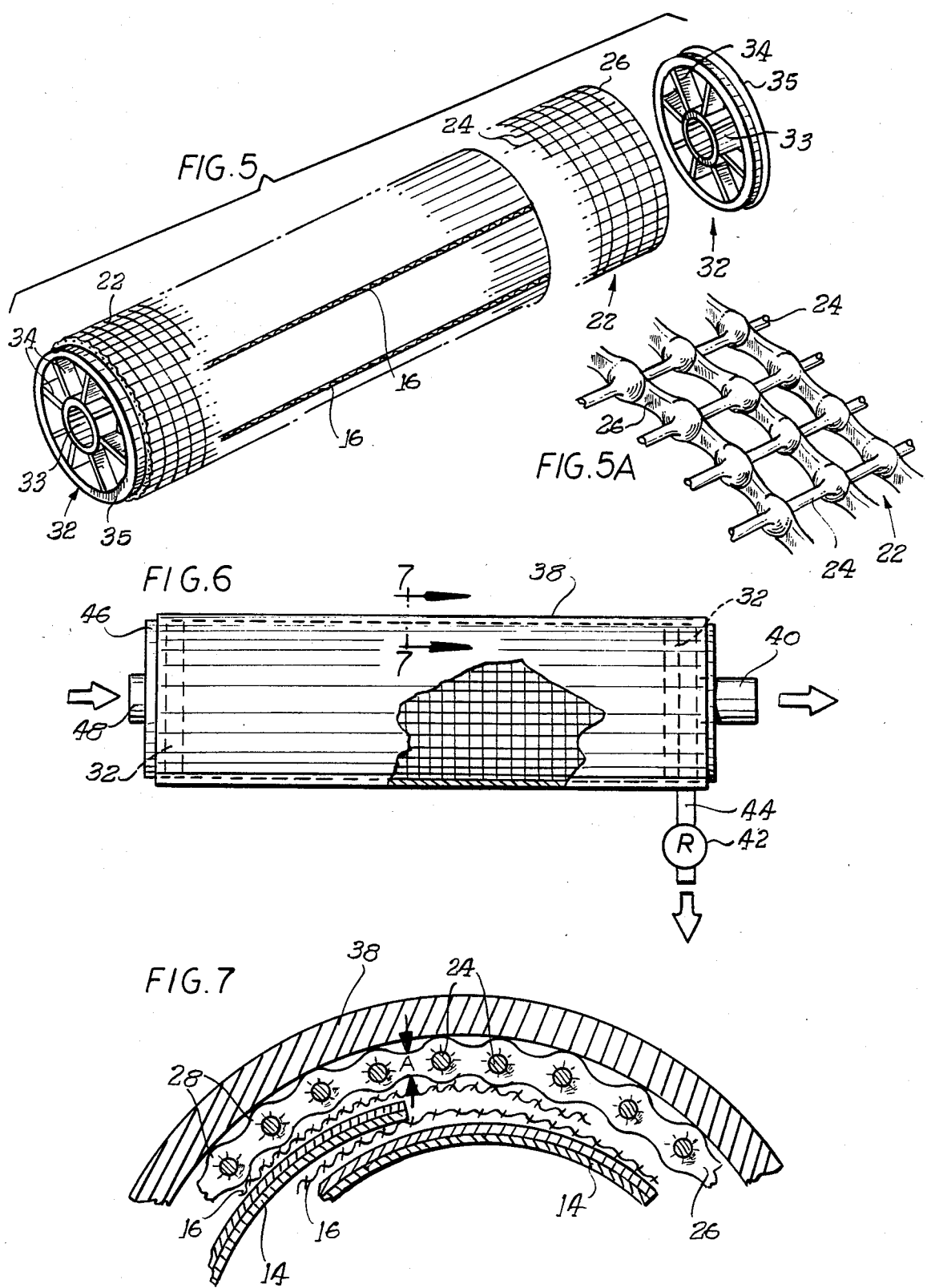

SPIRAL-WOUND MEMBRANE CARTRIDGE

The present invention relates generally to spiral-wound membrane cartridges for fluid separation treatments, and more particularly, to cartridges for use in reverse osmosis or ultrafiltration separation devices for treating a liquid feed and to devices for use in industries, such as the food industry and the pharmaceutical industry, where high purity of product and ease of cleaning are important considerations.

BACKGROUND OF THE INVENTION

The use of semipermeable membranes for effecting liquid separations has become well accepted, and membranes both for ultrafiltration applications and reverse-osmosis applications are presently in use for a wide spectrum of applications, including water purification, concentration of dilute mixtures or solutions, and waste treatment and/or recovery of recyclable components. A large variety of semipermeable membranes have been developed, and spiral-wound cartridges have been one accepted type of device which has been found valuable for efficiently providing a large amount of membrane surface area within a given spatial volume. While such spiral cartridges utilizing sheetlike membranes have proved satisfactory and have given good performance in many applications, improvements in devices of this type are constantly being sought, as no single separation device has yet proven to provide the best performance in every type of situation, particularly when considering the wide variations in feed materials that are encountered.

In the early 1970's, it was common to install such a spiral-wound cartridge in a separation device using one or a pair of peripheral seals in an attempt to block all flow of the liquid being treated in the annular region exterior of the cartridge and interior of the cylindrical wall of the housing wherein the cartridge was installed, as exemplified by the seal shown in FIG. 7 of U.S. Pat. No. 3,966,616, issued Jun. 29, 1976 to Donald T. Bray. Subsequently it was decided that, for certain applications, it might be worthwhile to permit a controlled bypass flow of liquid through this region. For example, U.S. Pat. No. 4,301,013 to D. Setti et al. shows the employment of an open-mesh type of netting material which can be of woven or nonwoven character and which can be either stretched over the cartridge like a tight-fitting sock or can be overwrapped in a single or multiple thickness or spirally or helically about the cartridge. U.S. Pat. No. 4,548,714 to Kirwin et al. shows forming such a controlled bypass region by extending a leaf of the porous grid material, through which the feed liquid flows axially through the cartridge, and then wrapping the extended leaf entirely around the cartridge to thus create an outer bypass region that is integral with the cartridge itself. Although such cartridge arrangements allow bypass flow through the annular region between cartridge and the sidewall of the housing, on a mass production basis sometimes problems arose in holding tolerances which made it difficult to install the cartridges in the pressure-tight housings on the site where they would be used and also in maintaining the amount of bypass flow within desired limits. As a result, improvements in the design of such spiral-wound membrane cartridges continued to be sought.

SUMMARY OF THE INVENTION

It has been found that improved spiral-wound cartridges for separation treatment of liquids can be provided by installing a seamless, highly porous, substantially rigid, tubular sleeve in surrounding relationship to a spirally-wound separation assembly including a reverse osmosis or ultrafiltration membrane. The sleeve should be of such a construction that it is consistently snugly received within a cylindrical chamber housing and that a closely controlled bypass flow of liquid is assured in the annular region. By sizing the thickness of the sleeve relative to the diameter of the chamber within which the cartridge will operate, an amount of bypass flow within fairly tight tolerances can be assured for a specified operating pressure. The overall arrangement is felt to be particularly valuable for applications where sanitation is of prime importance, including those where extremely high purity is critical, such as in the pharmaceutical industries for example, and those producing food and dairy products where it is necessary to carry out frequent cleaning, as by back-flushing and the like, because this overall design has proved to be relatively easy to clean and sanitize in a manner to meet the standards of local departments of health or the like as well as Federal standards. Moreover, the completed cartridges are self-contained units that are easier to ship and easier to install in the housings where they will be used than cartridges presently employed.

BRIEF DESCRIPTION OF THE DRAWINGS

FIG. 5 is a partially exploded perspective view, generally similar to FIG. 1, showing an alternative embodiment of a membrane cartridge;

FIG. 5A is a fragmentary view, enlarged in size, of the sleeve shown in FIG. 5;

FIG. 6 is a schematic assembly view showing the cartridge of FIG. 5 in use within an outer pressure-resistant container; and FIG. 7 is an enlarged fragmentary perspective view taken generally along the line 7—7 of FIG. 6.

DETAILED DESCRIPTION OF THE PREFERRED EMBODIMENTS

Figure 1:
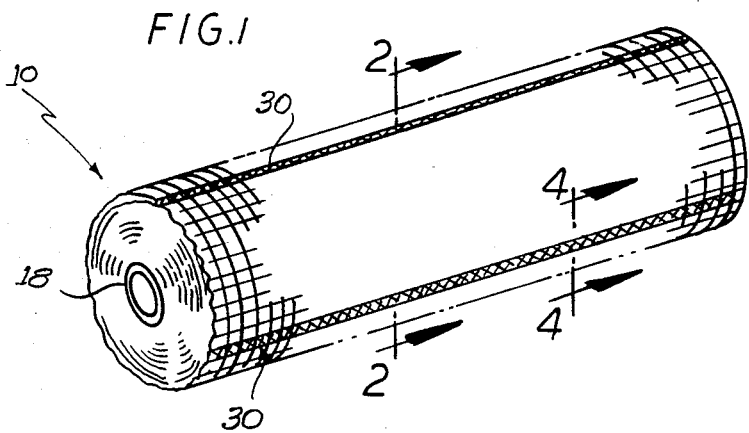
FIG. 1 is a perspective view of a membrane cartridge embodying various features of the invention.
Figure 2:
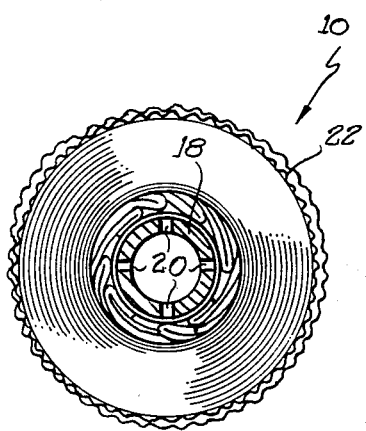
FIG. 2 is a cross-sectional view through the cartridge taken along line 2—2 of FIG. 1.
Figure 4:
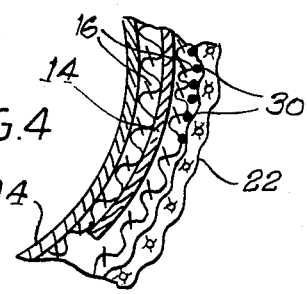
FIG. 4 is a fragmentary cross-sectional view, enlarged in size, taken generally along the line 4—4 of FIG. 1 illustrating a section of the outer surface of the cartridge.

Illustrated in FIGS. 1 through 4 is a cartridge 10 that includes a multilayer wrapping about a central tube 18 which serves as a permeate collection pipe. The side wall of the tube 18 is either made porous or is provided with defined openings 20 so that permeating liquid from the spiral windings can enter the tube therethrough. Although discharge might optionally be allowed to occur through both ends of the tube, preferably one end of the tube is closed, as by plugging the left hand end of the tube in FIG. 1, which then is usually employed as the feed inlet end of the cartridge. Very briefly, the incoming feed mixture will enter the spiral windings at the inlet end, i.e., the left-hand end in FIG. 1, and will flow axially through the spiral windings with the nonpermeating portion of the liquid exiting the opposite right-hand end of the cartridge. A circular spacer 32, such as that shown in FIGS. 5 and 6, may optimally be provided to create a defined outlet plenum.

Generally throughout the description, the term "feed mixture" is used to describe a liquid containing at least one other component, usually a dissolved solid or liquid; however, more than one dissolved or suspended component can be present. Furthermore, in some ultrafiltration separation processes, the feed mixture may carry suspended solids of minute size. During the travel of the feed mixture through the spiral windings of the cartridge axially from end to end, the permeating component, usually the solvent, will pass through the minute pores in a sheetlike membrane 14 while the remainder of the feed mixture continues to flow toward the discharge end, growing continuously more concentrated. The permeating component enters into a permeate carrier material 12 within which it travels spirally inward until reaching the porous central tube 18.

Figure 3:
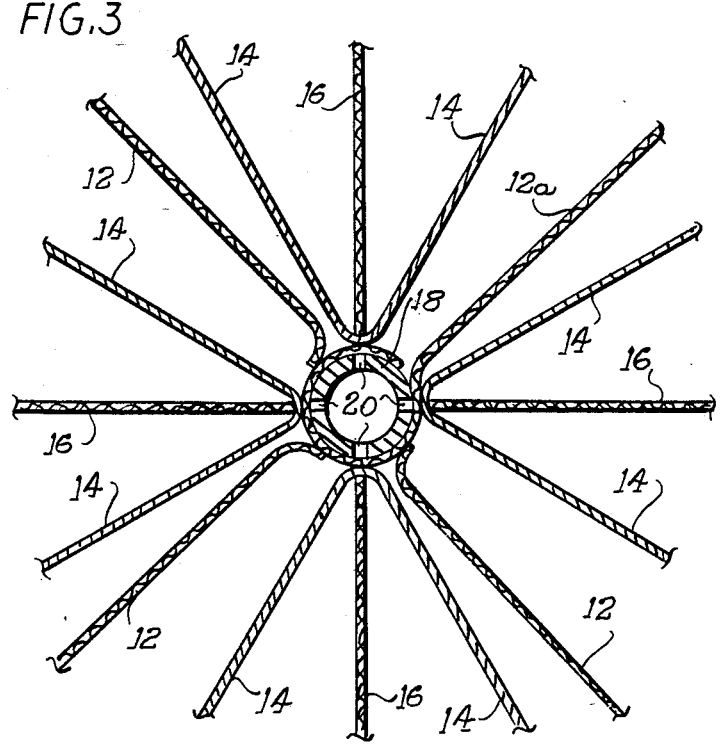
FIG. 3 is a cross-sectional view similar to FIG. 2 but showing the assemblage in its unwound condition.

Depicted in FIG. 3 is an illustration of an unwound cartridge 10 showing the central tube 18 and an arrangement of the various sheet material such as to create four composite leaves, within each of which leaves one length of the permeate carrier material 12 is sandwiched between two facing sheets of membrane 14. Although the central tube may extend out one or both ends of the cartridge, in the illustrated embodiment it is shown as being flush with the ends of the windings. Also, to ensure good liquid communication through the perforations 20 into the center of the tube 18, one of the sheets of permeate material 12a, which may be made of Dacron fabric or of rigidized knitted Tricot or the like, is preferably attached to the exterior surface of the tube as is well known in the art, and described in detail in the aforementioned U.S. Pat. No. 3,966,616, the disclosure of which is incorporated herein by reference. For example, the lateral edges of the permeate carrier 12 can be adhesively attached to the membrane sheets 14 by suitable bands of strips of adhesive, which adhesive also serves to seal the lateral edges so as to prevent any entry of feed mixture thereinto at either the inlet end or the outlet end thereof, while providing a bond to both associated membranes to create the sandwich.

The sheets of semipermeable membrane material 14 are preferably folded over themselves with the line of fold located at the interior edge near the tube 18 where spot adhesive bonding to the permeate carrier sheet 12a can optionally be effected. For purposes of production, a length of feed carrier material 16 is spatially arranged within the folds of each membrane sheet (see FIG. 3). In the arrangement, one-half of each folded-over membrane 14 either becomes adhesively attached along its three free edges directly to the facing membrane sheet 14 of the next adjacent folded subassembly, or both of these membrane sheets become adhesively attached to opposite surfaces of the length of permeate carrier 12 which they flank. In any event, the permeate carrier length 12 is sandwiched between the facing membrane half sheets and completely enveloped therewithin so that no liquid can enter the edges of the permeate carrier 12, allowing only the entry of permeate passing through the microporous surface of the membranes. These adhesively attached subunits are referred to as composite membrane leaves, and in the illustrated embodiment four of them are created with the four lengths of permeate material 12 serving as the "meat" in the four sandwiches.

Once the spiral winding of the cartridge is complete, it assumes the substantially cylindrical configuration depicted in FIG. 1, and it is then appropriately inserted into a seamless, highly porous, substantially rigid, tubular sleeve 22. As best seen in FIGS. 5 and 5A, the sleeve 22 is formed from a plurality of substantially parallel strands or ribs 24 which extend longitudinally thereof. The ribs are spaced at equal angular increments in a circular array, as best seen in FIG. 7, by means of interconnections with one another at uniformly-longitudinally spaced apart locations by a plurality of circular bands 26, each of which bands is aligned substantially transverse to the axis of the sleeve 22. The strands 24 and the circumferential bands 26 are both preferably formed from the same thermoplastic material, preferably polypropylene or polyethylene, which is of a physical character such that it is nonelastomeric and substantially rigid. The sleeves 22 are seamless in character and therefore substantially completely uniform around the circumference thereof; they can be made by suitable extrusion processes. As best seen in FIG. 7, the circular bands 6 are nonuniform in cross-section along their length so that a spheroidal knurl or knuckle 28 occurs at each intersection between a longitudinal strand 24 and a circular band 26.

It is the precise construction of the sleeve which assures that an amount of bypass flow within desired limits can be achieved at a specified operating pressure for the overall device. Very generally, a bypass equal to between about 2 and about 10 volume percent of the flow entering the cartridge is desired, and preferably the bypass flow is equal to between about 4 and about 6 percent and is generally independent of operating pressure. In order to achieve such an objective, the length of the sleeve should be at least three times its outer diameter and the thickness of the sleeve should be equal to at least about 2% of the radius of the sleeve. Accordingly, the thickness should be equal to at least about 1% of the diameter of the chamber within which the cartridge will be operatively located because, as shown in FIG. 7, there is point contact between each of the knurls 28 and the chamber sidewall. The thickness of the sleeve 22 is considered to be its thickness in the region of the spherical knurls 28. Moreover, the thickness of the strands should be equal to between about 40% and about 100% of the thickness of the circular bands 26 in the regions (see dimension A in FIG. 7) between the knurls. As also seen in FIG. 7, the individual strands are preferably circular in cross-section. The cross-section of the bands 26, in the regions where the dimension A is measured, is also preferably circular; however, they could be oval or elliptical.

The equiangular distances by which strands 24 are spaced apart from one another should be equal to between about one and five times the thickness of each strand, and preferably between about one and about three times the thickness. Taking into consideration the space between the adjacent strands 24, the adjacent circular bands are spaced apart from one another a sufficient distance so that the total open area between is equal to at least about 40% of the area of a right circular cylinder having the length and outer diameter of the sleeve 22. As also depicted in FIG. 7, the diameter of each of the spheroidal knurls 28 is preferably at least about two and one-half times the diameter of the strands.

As also best seen in FIG. 7, the relative lengths of the composite membrane leaves and the sheets of feed carrier material 16 is such that the feed carrier sheets extend past the ends of the adjacent composite membrane leaves and therefore, in the wound cartridge, constitute its outer surface. The semipermeable membrane material 14 can be of any of the well known reverse-osmosis or ultrafiltration membranes that have been developed over the past thirty years. They can be of the asymmetric type, such as the cellulose acetate membranes disclosed in U.S. Pat. Nos. 3,133,137 and 3,344,214 wherein a thin, active, dense layer is formed at one surface of cast polymeric material by selective evaporation or the like, whereas the remainder of the membrane throughout and extending to the other surface is of a much more porous composition which tends to integrally support the dense active surface layer which exhibits the semipermeable characteristics. Alternatively, the recently developed composite membranes can be employed wherein a dense, active layer is formed of a chemically different material than the nonactive supporting layer, examples of these being shown in U.S. Pat. No. 4,259,183 and U.S. Pat. No. 4,265,745. Such composite membranes can be made by any suitable method; however, frequently an interfacial condensation reaction is carried out whereby a thin film is formed by reactants which create a thin, dense, polymeric surface, such as a polyamide having the desired semipermeable characteristics. The porous, less dense, supporting layer adjacent which the interfacial condensation reaction takes place can be of any suitable polymeric material, such as a polysulfone, having the desired pore size to adequately support the ultra-thin, interfacial layer without creating undesirably high pressure drops across it. Suitable ultrafiltration membranes can be made by casting suitably porous membranes from polysulfone or by using other polymeric materials well known in this art, and for purposes of this application, ultrafiltration membranes are considered to be membranes which will not reject soluble salts or organics below about 5000 molecular weight.

Generally, materials that will be used for the construction of these cartridges will be selected by those having the ordinary skill in the art for the particular application in question. The central tube 18 may be of any suitable material compatible with the intended commercial use. For example, high strength plastic materials, such as polyvinylchloride, can be employed. The permeate transfer leaves may be of porous felt or fabric material, as well known in the art, and fabrics sold under the brand name "Tricot", e.g., rigidized knitted fabrics, made of polyester material are frequently used. The permeate carrier layer can also be a coated woven material, such as a Tricot polyester or an epoxy or melamine-coated polyester material. The adhesives used to bond the material can be of the polyurethane type, as well known in this art; epoxy resin formulations having suitable setting times can alternatively be employed, as well as other polymeric adhesives such as those which are polymers or copolymers of vinyl resins.

The feed carrier material 16 is selected to be a material which provides passageways that extend axially from the inlet to the discharge end of the cartridge and which are sufficiently flexible to allow their spiral winding about the interior tube 18. The function of the feed carrier material is to space the facing active surfaces of the panels of semipermeable membrane 14 apart from each other so that the feed mixture which is being pumped through the cartridge, usually at an inlet pressure of at least about 50 psig, can flow in contact with both active surfaces through which permeation occurs. Any suitable, relatively open material can be used that will not cause undesirably high pressure drops over the length of the axial passage therethrough, and preferably synthetic fiber materials are used, such as those made from thermoplastic polymers, including polyethylene and polypropylene. Woven screening material has been frequently used for the feed channels in such spiral-wound cartridges, and more recently, polypropylene netting or screening material, e.g., that sold under the tradename Vexar by Conwed Plastics, has been used in which both sets of parallel filaments are oriented at an angle of about 45° to the axial flow path.

Once the spiral winding of the cartridge assembly is complete, it is ready for insertion into the sleeve 22. Because insertion is carried out at the plant where the cartridges are produced, it is feasible to design an appropriate device for facilitating the mating of it with the sleeve. For example, a shoe might be designed in the form of a split tube into which the spirally wound module could be inserted and then the tube manipulated so that its outer diameter is reduced to just below that of the sleeve 22. After slipping the sleeve over the shoe, the split tube could be withdrawn leaving the spirally wound module snugly within the confines of the outer sleeve 22. Alternatively, the mating of the sleeve and the spirally wound module could be carried out by rotating the spirally wound module in a direction which tightens the spiral wrap and then inserting the module into the end of sleeve 22 while continuing the rotation until the module is fully inserted.

Once the sleeve nd the module are mated to complete the cartridge, the two can be suitably locked together by forming joints therebetween. For example, as shown in FIG. 1, longitudinally extending interconnections 30 are effected between the abutting surfaces of the sleeve 22 and the exterior surface of the feed carrier sheets 16 of the spiral module. Such interconnections can be made via the use of a suitable adhesive. Alternatively when the feed carrier sheets 16 and the sleeve 22 are both made of thermoplastic materials, and preferably of the same thermoplastic resin family, these interconnections 30 are conveniently made by thermobonding using localized heating at the abutting surfaces or by solvent bonding, both of which are well known in the art of achieving interconnections between thermoplastic materials. Once one or more of such longitudinal interconnections 30 has been effected, the cartridge 10 is easily handled as an integral component, and both shipping and installation of such cartridges is improved.

Although the aforementioned interconnections 30 with the sleeve constitute one way of assuring against separation of the sleeve and the spiral-wound membrane module, there remains the possibility that certain operating conditions, e.g., high inlet pressure, can cause telescoping movement of the inner tube 18 or of various of the windings, relative to the sleeve 22, to occur over time. In order to combat such telescoping, an arrangement such as that shown in FIG. 5 may be employed wherein a pair of substantially open spacers 32 are linked to the inlet end and to the outlet end of the spirally wound device to complete the cartridge. Each such spacer 32 should have a substantially open design to present a highly porous arrangement that will serve as a plenum chamber while at the same time confining the spiral windings of the membrane module from telescoping movement in an axial direction. In this respect, the spacers 32 may have a center tubular core 33 of about the same diameter as the center tube 18 of the membrane module which is spaced by a plurality of struts or spoke-like elements 34 from an outer rim 35. The rim 35 may be of generally U-shape in cross-section and can be provided with perforations so as not to hinder liquid flow therethrough. As best seen in FIG. 5, the U-shaped cross-section of the rim 35 allows it to be mechanically interconnected to the opposite ends of the sleeve 22, as by adhesively bonding strand portions of the sleeve which extend past the edge of the spiral-wound assembly to the interior wall of the generally concave rim. If the spacers 32 are molded from thermoplastic material, thermobonding or solvent bonding as discussed above can be used to create these mechanical interconnections. Once two such spacers 32 are installed, the cartridge assembly is complete, and the spiral-wound module is tightly confined by the sleeve 22 and the flanking spacers, again facilitating ease in its shipment and in installation in the ultimate separation device.

As shown in FIG. 6, the membrane cartridge is normally employed in the housing 38 which forms a pressure-resistant chamber for the overall separation device and which in a sanitary operation, such as a food processing or a dairy processing unit, might be made of stainless steel. Commonly, such a device will have an end plate 39 formed with a central discharge outlet 40 for the permeate which will also locate the downstream spacer 32 a predetermined distance from the transverse end wall surface to create a plenum leading to a side outlet 44. The outlet 40 includes a connector portion that protrudes into or suitably interconnects with the discharge end of the central tube 18 to which it will be suitably sealed, as by an O-ring seal or the like, as is well known in the art. The nonpermeating portion of the feed mixture will exit through the side outlet 44 of the housing 38. This outlet tube can carry a suitable restrictor 42, which can optionally be manually variable, or it can include some other type of pressure-regulating device so that a selected back pressure can be maintained, if desired, upon the concentrated, nonpermeating liquid that is being discharged, as a result of which a minimum pressure will consequently be maintained to assure there is adequate driving force throughout all of the spiral-wound cartridge to effect the desired permeation through the membrane. The cartridge is inserted and removed through either the inlet end or the outlet end of the housing which are then closed by removable end plates or caps 46, 39, respectively, as is well known in the art. The inlet end plate 46 includes an inlet opening 48 through which the feed mixture being treated is suitably pumped, as shown by the arrow at the left-hand side of FIG. 6.

Because close tolerances can be maintained by the use of the rigid, substantially noncompressible sleeves 22, a closely controlled bypass flow is created in the peripheral annular region occupied by the sleeve 22 and the adjacent outer short extensions of the feed carrier material 16. The amount of bypass flow is carefully controlled by the resistance to flow provided by the circular bands 26 of the sleeve. As previously mentioned, there is point contact between the spheroidal knurls 28 and the interior wall of the housing 38, and the gaps between these adjacent points of contact regulate the amount of the controlled bypass flow. Thus, it can be seen that control of the construction which results from effectively caging the spiral-wound module within such rigid sleeves not only assures ease of installation of the cartridge in the housing, but assures consistent operating performance because of the controlled bypass flow. Such performance can be extremely important in applications where high purity and frequent cleaning are necessary, and there are also other advantages. In high purity applications, the elimination of seals and wrappings for the cartridges (which of necessity introduce additional materials into the separation device) removes potential contaminants which are not normally associated with the thermoplastic materials from which the sleeves 22 are constructed. Even more importantly when sanitary-type installations are concerned is the ease and thoroughness with which cleaning can be accomplished, and because there are essentially straight flow paths through the annular peripheral regions and because there is preferably a relatively large amount of open space, e.g., at least about 50%, difficult to cleanse nooks and crannies are avoided. As a result, adequate cleaning by flushing or the like using appropriate disinfecting solutions can be carried out in a short period of time to meet health department standards so that downtime for cleaning is minimized.

One example of a spirally wound cartridge 10 embodying features of the invention is a cartridge having an axial length of about 35 inches which is fabricated to be used in a housing having an internal diameter of 3.844 inches. In this cartridge, the central perforated tube 18 has an outer diameter of about 0.84 inches, and five composite leaves of permeate carrier material 12 sandwiched between panels of semipermeable membranes 14 are spirally wound about the tube together with interleaved sheets of Vexar cross-extruded polypropylene netting having a thickness of about 0.03 inch and a radial length of about 38 inches. Each composite leaf has a radial length of about 36 inches, and after spiral winding, the module is installed in an appropriate rigid sleeve 22 having an outer diameter of 3.82 inches. The radius of each spheroidal knuckle is about ⅛ inch, and the sleeve includes about 60 parallel longitudinally extending strands 24 equiangularly spaced about the circumference, each of which is essentially circular in cross-section having a diameter of about 0.06 inch. The circular bands 26 are also circular in cross-section and have diameters in the regions A of about 0.08 inch. Adjacent circular bands are spaced about ¼ inch apart, and as a result, the open area totals about 43% of the sidewall surface of the sleeve. The sleeve 22 is substantially equal in length to the axial length of the spirally wound membrane elements. Operation of this cartridge at an inlet pressure of about 110 psig and an outlet pressure of about 100 psig to separate an aqueous feed containing about 6.0% of dissolved solids, and having a viscosity about that of water at an operating temperature of 50° C., results in a bypass flow of about 5% of total flow into the cartridge through the annular region. Such a flow is well within desired tolerances as not detracting unduly from the primary flow through the membrane cartridge itself where separation is occurring while at the same time being sufficient to assure that there is no stagnation occurring which could allow undesirable bacteria or other microorganism buildup.

Although the invention has been described in respect of certain preferred embodiments which constitute the best mode presently envisioned by the inventors for carrying out the invention, it should be understood that various changes and modifications as would be obvious to one having the ordinary skill in this art may be made without departing from the scope of the invention which is set forth in the appended claims.

Particular features of the invention are emphasized in the claims that follow.

What is claimed is:

1. A reverse osmosis or ultrafiltration separation device for treating a liquid feed which comprises
   a porous central tube for carrying permeate,
   at least one separation assembly wound in spiral relationship about said central tube, said assembly including
   an elongated envelope made of semipermeable membrane material which includes a central permeate passageway interior of said envelope and
   feed-passageway-providing sheet material spirally wound with said envelope to supply a liquid feed to be treated to the exterior surfaces of said envelope, a portion of which feed permeates through said membrane envelope into said central passageway,
   said central passageway being in communication with the interior of said central tube,
   a housing having a cylindrical chamber of circular cross section for holding said spiral wound separation assembly, having an inlet for the supply of feed to be treated, having an outlet for exit of the portion of the feed which does not permeate through said semipermeable membrane and having an exit for the permeate which collects in said central tube, and
   a seamless, highly porous, substantially rigid, tubular sleeve tightly surrounding said spirally wound separation assembly, said sleeve being proportioned so that said sleeve and said surrounded spirally wound separation assembly is snugly received within said cylindrical chamber,
   said sleeve having a predetermined thickness relative to the diameter of said chamber so that desired bypass flow of feed liquid will occur in the space occupied by said sleeve.

2. A separation device in accordance with claim 1 wherein said sleeve has a length at least about three times its diameter and said sleeve is formed from a plurality of substantially parallel strands which extend longitudinally thereof, which longitudinal strands are interconnected by a plurality of spaced-apart, generally circular bands that are aligned substantially transverse to the axis of said tubular sleeve.

3. A separation device in accordance with claim 2 wherein said longitudinal strands and said generally circular bands are made of thermoplastic material and are joined to one another by enlarged interconnections at their points of intersection.

4. A separation device in accordance with claim 3 wherein the presence of said generally circular bands retards liquid bypass flow along the exterior surface of said spirally wound assembly in the spacial region of said sleeve, with said enlarged interconnections between said bands and said longitudinal strands at the points of intersection being in point contact with the interior surface of said cylindrical housing and creating passageways between adjacent contact points along the interior surface of said housing through which liquid bypass flow occurs at a desired rate.

5. A separation device in accordance with claim 4 wherein said enlarged interconnections are spheroidal in shape and are of sufficient size so that said strands and the remainder of said generally circular bands are out of contact with the interior surface of said housing.

6. A separation device in accordance with claim 3 wherein said longitudinal strands and said generally circular bands are formed from polypropylene.

7. A separation device in accordance with claim 3 wherein said feed-passageway providing sheet material is made of thermoplastic material and includes a portion extending spirally past the ends of said envelope to constitute part of the outermost region of said assembly and wherein mechanical interconnections exist between such extending portion and said sleeve.

8. A separation device in accordance with claim 7 wherein said enlarged interconnections are spheroidal in shape and are bonded adhesively to said thermoplastic sheet material.

9. A separation device in accordance with claim 2 wherein said parallel strands are spaced uniformly apart from one another along the circumference of said circular bands.

10. A separation device in accordance with claim 2 wherein the thickness of said strands is equal to between about 50% and about 100% of the thickness of said circular bands.

11. A separation device in accordance with claim 10 wherein said strands and said bands of said sleeve are both substantially circular in cross section.

12. A separation device in accordance with claim 1 wherein the thickness of said tubular sleeve is equal to at least about 2% of the radius of said chamber.

13. A separation device in accordance with claim 1 wherein said strands are spaced apart from one another a distance equal to between about one and about three times the thickness of the strands.

14. A separation device in accordance with claim 1 wherein the total open area in the regions between adjacent strands and adjacent bands is at least about equal to 40% of the lateral surface area of a cylinder having the length and diameter of said sleeve.

15. A separation device in accordance with claim 14 wherein a second highly porous containment element of circular shape is located adjacent the upstream end of said spirally wound assembly and is connected generally adjacent its circumference to the upstream end of said sleeve, so that said assembly is caged within said sleeve and said containment elements to constitute an integral unit.

16. A separation device in accordance with claim 1 wherein a highly porous containment element of circular shape is located adjacent the downstream end of said spirally wound assembly and is connected generally adjacent its circumference to the downstream end of said sleeve.

* * * * *

UNITED STATES PATENT AND TRADEMARK OFFICE
CERTIFICATE OF CORRECTION

PATENT NO. : 4,906,372

DATED : March 6, 1990

INVENTOR(S) : HOPKINS, et al.

It is certified that error appears in the above-identified patent and that said Letters Patent is hereby corrected as shown below:

On the title page: following the last line under "References Cited", insert:

```
--3,966,616  6/76    Bray                210/433
  4,301,013 11/81    Setti et al.        210/637
  4,548,714 10/85    Kirwan, Jr. et al.  210/232
```

OTHER PUBLICATIONS:
"Thermoplastic Webs", 8 page brochure, Conwed Plastics, 1987--.

Column 4, line 22, "6" should read --26--. Column 6, line 32, "nd" should read --and--.

Signed and Sealed this

Eighth Day of June, 1993

Attest:

MICHAEL K. KIRK

*Attesting Officer*     Acting Commissioner of Patents and Trademarks